Oct. 9, 1956  R. R. REINHART  2,766,120
METHOD AND APPARATUS FOR PUFFING CEREALS
Filed Dec. 8, 1952  2 Sheets-Sheet 1

INVENTOR:
Robert R. Reinhart
BY Floyd Trimble
ATTORNEY

Oct. 9, 1956 R. R. REINHART 2,766,120
METHOD AND APPARATUS FOR PUFFING CEREALS
Filed Dec. 8, 1952 2 Sheets-Sheet 2
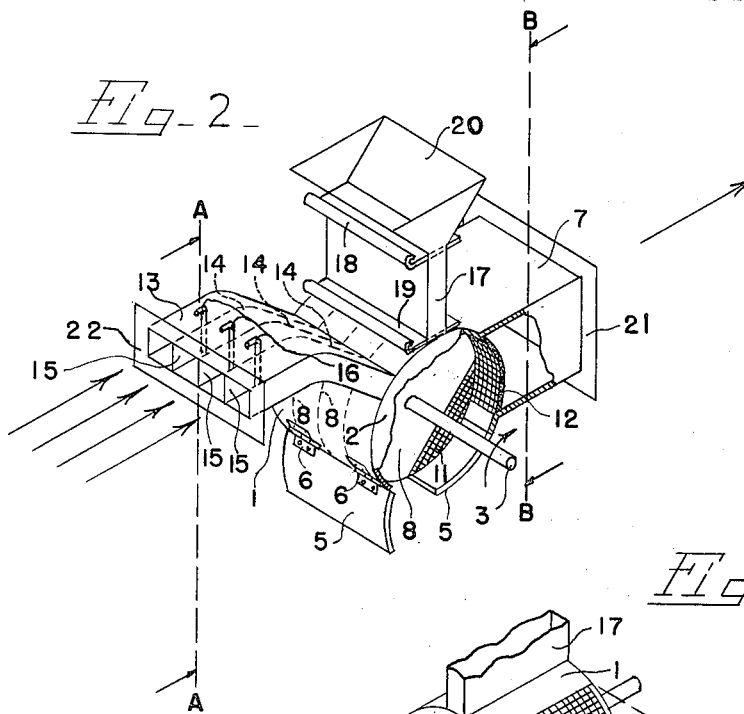
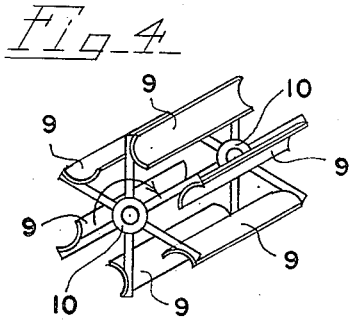
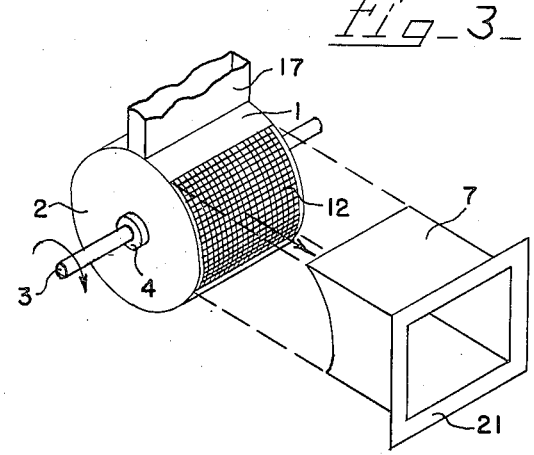
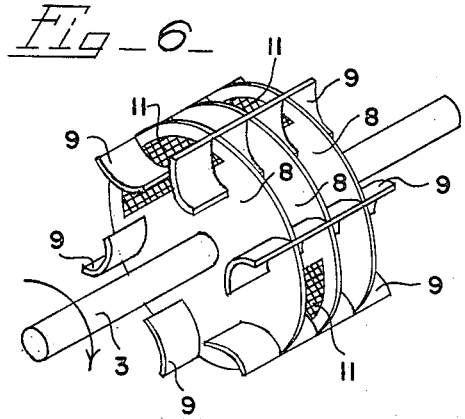
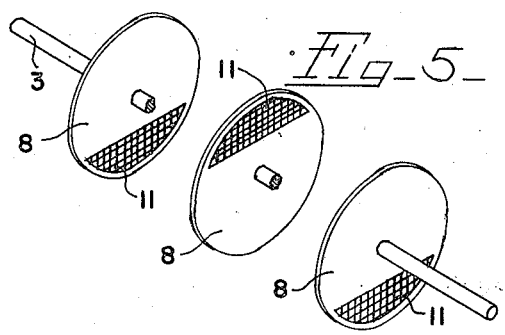
INVENTOR:
Robert R. Reinhart
BY Floyd Trimble
ATTORNEY

United States Patent Office

2,766,120
Patented Oct. 9, 1956

2,766,120

METHOD AND APPARATUS FOR PUFFING CEREALS

Robert R. Reinhart, Chicago, Ill., assignor to The Quaker Oats Company, Chicago, Ill., a corporation of New Jersey Application December 8, 1952, Serial No. 324,720

15 Claims. (Cl. 99—82)

This invention relates to a method and apparatus for preheating cereal grains prior to puffing and is an improvement of copending application Serial No. 165,764, filed June 2, 1950, now Patent No. 2,698,799, and assigned to the present assignee.

Reference is hereby made to the above identified copending application for further background to the puffing of cereal grains which is hereby made a portion of this application. While the apparatus described in the copending application is particularly adapted for the processing of wheat thus eliminating the disadvantages in the processing of this grain, it is not entirely satisfactory for rice. Accordingly it is one object of this invention to provide a method and apparatus for puffing cereal grains which is equally adaptable to the processing of wheat or rice. It is another object of this invention to provide a method and apparatus for puffing cereal grains such as wheat and rice in which losses due to insufficient puffing or scorching are materially reduced. A further object of this invention is the provision of a puffed product particularly wheat and rice which has a greater volume than the usual product produced by prior commercial operations. A still further object of this invention is the provision of a process and apparatus in which the product obtained therefrom is uniform. Yet another object of this invention is the provision of a puffing process and apparatus for cereal grains in which it is not necessary to preheat the grains within the gun prior to the final pressurizing and puffing step. Further and additional objects will appear from the following description, the accompanying drawings, and the appended claims.

In brief, the invention resides in quickly heating the cereal grains such as wheat or rice to an elevated temperature and thereafter the wheat or rice, without substantial cooling, is introduced into a preheated puffing chamber. The chamber is sealed, steam is injected into the gun to build up the pressure therein and maintained for a definite period after which the closure of the chamber is suddenly released causing the grains to puff. An important feature of this invention is the provision of a process and apparatus in which the cereal grains while being agitated are rapidly preheated to a temperature above 212° F. preferably within the range of 240 to 320° F. by a gas stream such as a current of air heated to a temperature within the range of 350 to 1200° F. preferably within the range of about 850 to about 1000° F. for a period of about 15 to about 60 seconds. Since the grain is heated to the desired temperature very quickly, there is only a small reduction in the moisture content of the grain. After the cereal grains have been so heated they are immediately introduced into a puffing chamber which has been preheated and under conditions such that the heated grains prior to the puffing operation are not allowed to cool much below the temperature attained in the preheating chamber.

For a more complete understanding of this invention reference will now be made to the accompanying drawings in which: Fig. 1 is a schematic view of a device or apparatus embodying this invention and in which the process of this invention may be carried out. For a better understanding of the invention the grain preheating unit (portion of equipment included between the lines A—A and B—B) is drawn in a different plane from that used for the rest of the equipment;

Fig. 2 is a cut away view taken along the lines A—A and B—B of Fig. 1 (paddles not shown);

Fig. 3 is a sectional view showing the exhaust screen of the heating chamber;

Fig. 4 is a detail view showing the rotating paddles for agitating the grain and their supporting arms;

Fig. 5 is a detail view showing the rotating separators or partitions which are located within the heating chamber;

Fig. 6 is an enlarged detail view showing the heating chamber impeller mounted on the shaft. The rotating paddles of Fig. 4 and the rotating separators or partitions of Fig. 5 are combined in practice to form the heating chamber impeller.

Figure 1:
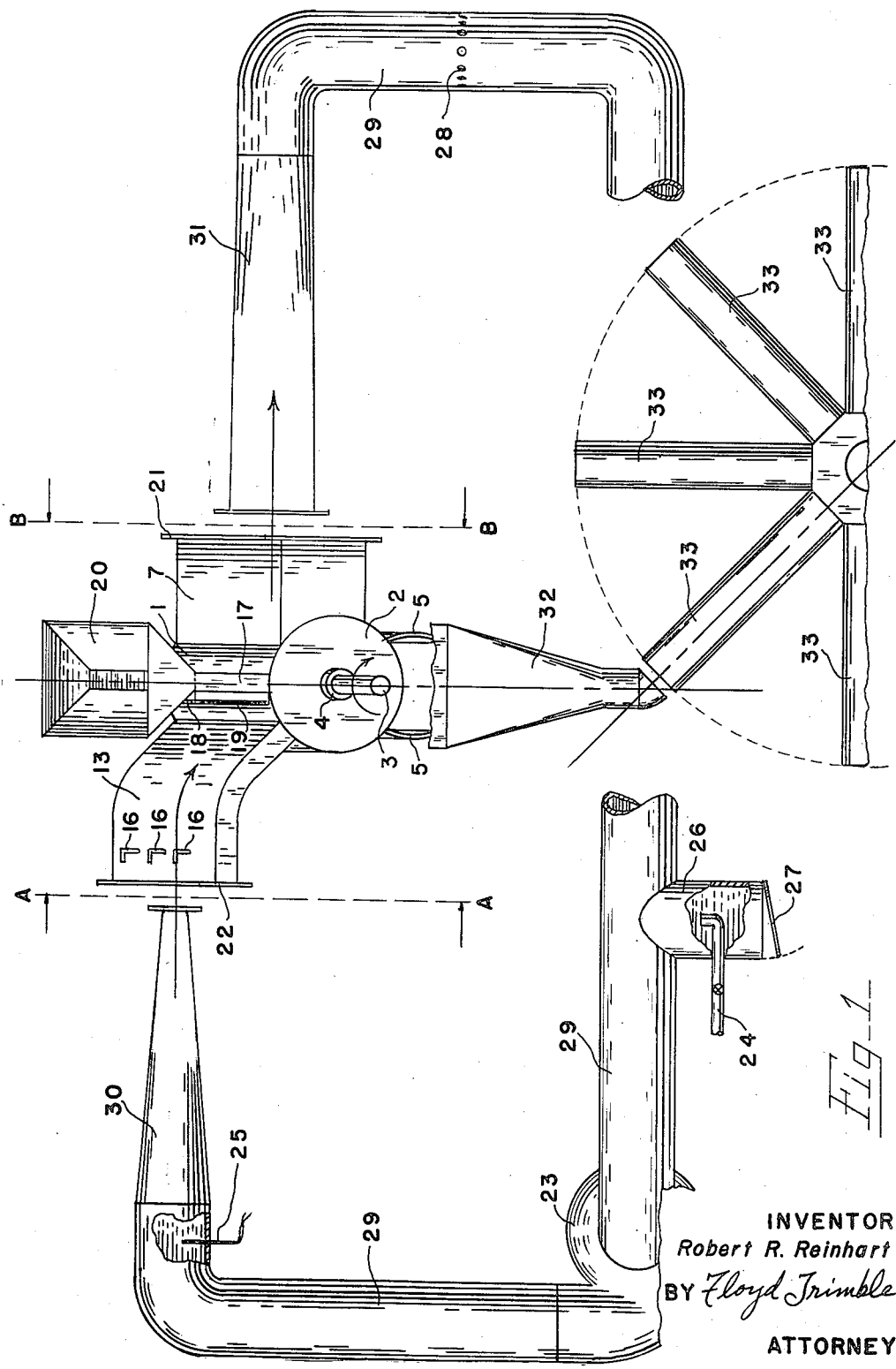

In accordance with the present invention the cereal grains such as wheat or rice are heated quickly to an elevated temperature above about 212° F. prior to the time that the wheat or rice is charged into the puffing gun. This heating in the apparatus shown in the drawing is effected by charging the wheat or rice to be puffed into the hopper 20 having a depending conduit 17 which periodically discharges the grain into the heating chamber as shown in Fig. 2. To permit the flow of hot gases through the heating chamber it is constructed with gas inlet and outlet ports. The inlet port opening may be covered with a screen or left open as desired, however, the outlet port must be covered with a material foraminous in nature preferably a stainless steel screen or other suitable perforated sheet material 12 to prevent grain from being blown out of the chamber. The heating chamber traverses the hot air ducts 30 and 31 through which hot air or other suitable hot gas may be circulated by means of a fan or blower 23. A gas burner or other means of heating 24 is employed to heat the air in the duct. Thus cereal grains are passed downwardly into the heating chamber 1 and a current of hot air or other gas is simultaneously passed through adapter duct 13 then through the heating chamber where the grain is exposed, then out through perforated covering 12 and adapter duct 7. The hot air duct is provided with conduit 26, butterfly valve 27, and the vent ports 28 for adding fresh gas and for withdrawing gas from the circulating system as may be desired.

After the hot grain has been introduced into puffing chamber 33 at station 34 from the heating chamber 1, the turret 35 rotates to close the puffing chamber while the next chamber 33 is being loaded at station 34, as will be apparent from the disclosure in the Andrews Patent No. 2,414,185. As each puffing chamber progresses from station 34 to the explosion station (not shown) it is sealed and steam is admitted to build up a suitable pressure for the final puffing operation. For wheat this pressure is about 215 p. s. i. g. with a pressurizing cycle of 3 minutes. Although this same procedure may be used for rice, a preferred method of operation is as follows:

After sealing, the pressure in the chamber is allowed to reach about 160 p. s. i. g. in a period of 2 minutes and 40 seconds, then for the next 4 seconds the chamber is opened slightly allowing steam to escape and the pressure to drop to about 140 p. s. i. g. The chamber is then resealed, steam injected causing the pressure to increase over a period of 4 seconds to about 150 p. s. i. g. and then fired.

In order that the amount of grain to be charged to each puffing chamber 33 may be readily controlled there is provided a measuring device (Fig. 2) which comprises a pair of spaced dampers or slides 18 and 19 mounted in such a way that when slide 18 moves to close the conduit 17 at the point where it is located slide 19 will move to open the conduit 17 at the point where it is located. Thus when slide 18 is open slide 19 will be closed and vice versa. The space between the two slides 18 and 19 determines the amount of grain that is to be included in each charge to the pressure chambers 33.

In one particular form of the device the volume of the space between the dampers 18 and 19 in the conduit 17 is such that a charge of about 6 pounds of wheat or rice is added to each puffing chamber in each cycle of operation. Each puffing chamber 33 is cylindrical in form and has a diameter of 3 inches and a length of about 24 inches. The preheating chamber, also cylindrical in form, is 14 inches in diameter and 11 inches long.

In one operation the air used to preheat wheat was at a temperature of 850° F. and the average time the wheat remained within the heating chamber was about 30 seconds. The rate of flow of hot air through duct 30 was controlled so that the temperature of the wheat at the point of discharge was about 270° F. In another operation wherein rice was processed the air used was heated to a temperature of 1000° F. and the average time the rice remained within the heating chamber was 40 seconds. The rate of flow of hot air through duct 30 was controlled so that the temperature of the rice at the point of discharge was about 290° F.

In operation the impeller Fig. 6 can turn at any desired speed to simulate any grain agitating conditions but for the most part the speed of rotation is such so as to carry the grain from bottom center to top center of the heating chamber 1 by means of paddle members 9. The grain then falls free to the bottom portion of the heating chamber 1. This free falling action of the grain from the top portion of the heating chamber 1 is aided by the offset mounting of the curved paddles 9 on the paddle arms 10. The concave surface of the paddles, of course, must face in the direction of rotation. During this tumbling period a current of hot gas passes through the chamber thus heating the grain. After a predetermined time the grain is discharged into the chute 32 by opening the two doors 5, which pivot on hinges 6. The shaft 3 of the impeller rotates in the two bearings 4 (only one shown) the bearings in turn are supported by the heating chamber end plates 2. As shown the rotating impeller is fitted with three disc dividers or partitions 8 which in turn are fitted with perforated inserts 11. The purpose of the perforated inserts 11 is to eliminate any possibility of the current of hot gases passing through the chamber from channeling. For best results the discs or partitions 8 are mounted on the shaft so that that perforations 11 are staggered. The adapting duct 13 attached to the hot air conduit 30 by means of the flange 22 is fitted with three partitions 14 the purpose of which is to separate the gas stream into three streams. To insure that the flow of gas through each is equal the partitions are fitted with the dampers 15 controlled by means of the levers 16. Although the apparatus illustrated contains four compartments, it is obvious that a greater or smaller number may be used. This arrangement avoids channeling of the hot gases and results in even heating of the grains being heated. For best results, however, the number of compartments in the heating chamber should equal the number of compartments in the duct 13. On the exhaust side of the unit adapting duct 7 is attached to the hot air conduit 31 by means of the flange 21.

It will be apparent from the foregoing description that a process and apparatus have been provided for imparting a dry heat to the grain by passing hot air or other gas thereover prior to the time that the grain is discharged into the puffing chamber 10. When employing this process it has been found that the moisture content of wheat is reduced from a normal of about 10 to 12 percent to about 9 to about 11 percent by weight. In the case of rice the moisture content is reduced from a normal of about 12 to 14 percent to about 9 to 11 percent by weight. If desired, the loss in moisture content during the preheating operation can be reduced still further by introducing steam into the heated gas stream. Such a procedure has the further advantage in that the grain may be heated to the desired degree at a lower gas temperature. For example, when using steam the preferred temperature range becomes 400 to 650° F. The temperature to which the grain is heated in the heating chamber should be above about 212° F. and below about 350° F. The product is not acceptable if not preheated to at least 212° F. and at the higher temperatures the contact time should, of course, be controlled so that no substantial scorching or discoloration of the grain will occur as it passes through the heating zone. Generally speaking, it is preferred that the temperature of the wheat or rice should be within the range of about 220° F. and about 320° F. It is also important to note that the heated grain is fed to each puffing chamber 33 while it is still hot and the temperature thereof should not be allowed to cool below about 212° F. or preferably below about 220° F. Furthermore, the puffing chamber itself does not exert a cooling effect on the grain prior to the time that the chamber is sealed for puffing because the chamber previously has been preheated. This temperature will ordinarily be above 212° F.

The preheating step as disclosed herein considerably reduces the overall time required and the losses that are ordinarily obtained in commercial puffing operations. For example, by the practice of the preheating step of this invention, the overall time has been reduced from about 9 minutes to about 4 minutes. As another example, puffing losses have been reduced from about 7 to about 3½ percent. In addition, the product of this improved process is very uniform and has an increased volume. Likewise, by practicing this invention the usual preheating step is eliminated and this is a decided advantage because proper control of the preheating step in the gun is difficult. Also by providing a readily controlled outside means for preheating the grain prior to passing into the puffing chamber the tendency to scorch or burn the product is practically eliminated.

In the foregoing description this invention has been described particularly with reference to the multiple type gun of the general character disclosed in Andrews' Patent No. 2,414,185. This invention, however, is not to be limited in its use to guns of this particular type since the broad invention finds application for use in many types of puffing guns, such as the type disclosed in the Plews Patent No. 2,116,212 or the Warren Patent No. 2,261,456.

The reasons why the process of this invention is capable of producing a product having improved properties is not entirely clear. I have not found any correlation between the improvement noted and the amount of water that may have been removed from the grain by the drying process except that the final moisture content should be above about 6 percent by weight otherwise the resulting product will be brittle. My experiments indicate that the improved results noted are in some way connected with preventing the condensation of any water on the grain within the expansion gun or chamber prior to the puffing operation. As for example if the temperature of the grain when added to the gun is above 212° F. good results are obtained and if below 212° F. the results are poor. Furthermore I have found that if the heated grain is cooled then reheated to a temperature above 212° F. prior to its addition to the puffing gun it is again possible to obtain a good puffed product.

Heating the grain in my preheater as compared to heating the grain in the gun according to the prior art method produced a different result as will be apparent from a study of the data of Table I below. These data summarizing certain properties of the treated samples were obtained by investigating samples of rice which had been heated by the two methods followed by quickly cooling. For comparison purposes the constants of raw or untreated rice were also determined and listed as the control.

*Table I*

| Method of Heating | Grain Temp., °F. | Moisture, percent | | Amylograph | | | Water absorption by ground product in percent at end of— | | Sample |
|---|---|---|---|---|---|---|---|---|---|
| | | Initial | After heat Treatment | Area, in.² | Viscosity | | 15 min. | 18 hrs. | |
| | | | | | Peak | End | | | |
| Control | | 12.4 | | 22.8 | 980 | 550 | 71.8 | 71.8 | |
| In my preheater | 283 | 12.5 | 10.6 | 20.8 | 820 | 630 | 68.7 | 78.9 | A |
| Prior art | 270 | 12.7 | 10.2 | 9.8 | none | 325 | 104 | 139 | B |

The data given above not only show a difference between the two heated samples but it is also obvious that rice heated by my quick heating process resembles raw rice much more closely than it does rice preheated by the conventional process.

The cooled samples, A and B of Table I, were then puffed following the usual procedure for puffing in which the rice was preheated a second time in the gun, the pressure partially reduced by bleeding followed by building up the pressure to a predetermined value after which the pressure was suddenly released. The experiments together with the results are summarized in Table II. Here again the data indicate that heating in my preheater is different from heating by the conventional process. For the control the constants of a sample of puffed rice which was a sample of raw rice puffed by the conventional process were also determined.

*Table II*

| Sample | Wt. of 125 in.³ in gms. | Amylograph | | | Viscosity in centipoises by Synchrolectric Viscometer |
|---|---|---|---|---|---|
| | | Area, in.² | Viscosity | | |
| | | | Peak | End | |
| Control | 136 | 25.3 | 355 | 330 | 441 |
| Preheater (A) | 124 | 27.2 | 365 | 340 | 494 |
| Conventional process (B) | 120 | 30.5 | 405 | 375 | 750 |

While a particular embodiment of this invention is shown above, it will be understood, of course, that the invention is not to be limited thereto, since many modifications may be made as for example the partitions in the heating chamber may be stationary rather than rotatable as illustrated; neither is it imperative that the perforated segments of the partitions be staggered. It is contemplated, therefore, by the appended claims to cover any such modifications as fall within the true spirit and scope of this invention.

I claim:

1. In a process for explosively puffing cereal grains, the improvement which comprises feeding said grains into a confined space accessible to the traversing flow of a hot gas therethrough, agitating said grains therein while passing a stream of hot air introduced at a temperature of about 350 to about 1200° F. through said confined space until said grains have reached a temperature range of from about 240° F. to about 320° F., introducing said grains while still within said temperature range into a puffing gun and then explosively puffing said grains by discharge from said gun.

2. In a process for explosively puffing cereal grains, the improvement which comprises feeding said grains into a confined space accessible to the traversing flow of a hot gas therethrough, agitating said grains therein while passing a stream of hot air introduced at a temperature of about 850 to about 1000° F. through said confined space until said grains have reached a temperature of from about 240° F. to about 320° F., introducing said grains while still within said temperature range into a puffing gun and then explosively puffing said grains by discharge from said gun.

3. In a process for explosively puffing cereal grains, the improvement which comprises feeding said grains into a confined space accessible to the traversing flow of a hot gas therethrough, agitating said grains therein for a period of about 15 to about 60 seconds while passing a stream of hot air introduced at a temperature of about 850 to about 1000° F. through said confined space until said grains have reached a temperature of about 240° F. to about 320° F., introducing said grains while still within said temperature range into a puffing gun and then explosively puffing said grains by discharge from said gun.

4. In a process for explosively puffing wheat, the improvement which comprises feeding a measured quantity of wheat into a confined space accessible to the traversing flow of a hot gas therethrough, agitating said wheat therein while passing a stream of hot air introduced at a temperature of about 350 to about 1200° F. through said confined space until said wheat has reached a temperature of about 240° F. to about 320° F., introducing said wheat while still at a temperature above 212° F. into a puffing gun and then explosively puffing said wheat by discharge from said gun.

5. In a process for explosively puffing rice, the improvement which comprises feeding a measured quantity of rice into a confined space accessible to the traversing flow of a hot gas therethrough, agitating said rice therein while passing a stream of hot air introduced at a temperature of about 350 to about 1200° F. through said confined space until said rice has reached a temperature of about 240° F. to about 320° F. introducing said rice while still within said temperature range into a puffing gun and then explosively puffing said rice by discharge from said gun.

6. In a process for explosively puffing wheat, the improvement which comprises feeding a measured quantity of wheat into a confined space accessible to the traversing flow of a hot gas therethrough, agitating said wheat therein while passing a stream of hot air introduced at a temperature of about 850 to about 1000° F. through said confined space until said wheat has reached a temperature of about 240° F. to about 320° F., introducing said wheat while still within said temperature range into a puffing gun and then explosively puffing said wheat by discharge from said gun.

7. In a process for explosively puffing rice, the improvement which comprises feeding a measured quantity of rice into a confined space accessible to the traversing flow of a hot gas therethrough, agitating said rice therein while passing a stream of hot air introduced at a temperature of about 850° to about 1000° F. through said confined space until said rice has reached a temperature about 240° F. to about 320° F., introducing said rice while still within said temperature range into a puffing gun and then explosively puffing said rice by discharge from said gun.

8. In the art of puffing cereal grain by explosive discharge from a pressure zone, the improvement which comprises agitating the cereal grains prior to their introduction into the puffing zone in an atmosphere heated to a temperature within the range of from about 350° F. to about 1200° F. so quickly that the grains will attain a temperature within the range of from about 240° F. to about 320° F. within a time period not substantially exceeding about one minute and with the loss of but a small amount of moisture, and immediately and without substantial drop in temperature introducing said grain into the pressure zone.

9. The process as defined in claim 8 when applied to grains of rice.

10. The process as defined in claim 8 when applied to grains of wheat.

11. In an apparatus particularly adapted for the rapid puffing of cereal grains, the improvement which comprises a grain preheating device which latter consists of a heating chamber having closed end and confining side walls, and which contains a gas inlet and an exhaust port, rotatable curved paddles disposed within said chamber and located so as to be substantially coincident with the longitudinal axis of said chamber, and having the outer edges of said paddles terminating a short distance from the side walls of said chamber, a plurality of partitions disposed within said chamber, a segment of each of which partitions being perforated, means for blowing a hot gas through said chamber, and a puffing gun and means associated therewith for discharging heated grains directly from said preheating device to said puffing gun.

12. In an apparatus for puffing cereal grains comprising the combination of a grain preheating device which latter consists of a chamber having side walls and substantially circular confining walls contiguous with the side walls, agitating paddles mounted on a shaft traversing the central portion of said side walls, said paddles being dished, the paddles being subdivided into a number of individual paddle wheels with partitions therebetween, said partitions being partly perforated, means for introducing cereal grains incrementally into the said heating chamber and likewise incrementally removing them therefrom, said removing means comprising downwardly hinged flaps, means for passing a heated gas through said chamber so as to heat the contents thereof rapidly to a temperature of about 240° to 320° F., and a puffing gun and means for directing the heated grains thereinto.

13. In an apparatus for puffing cereal grains comprising the combination of a grain preheating device and a puffing gun, said preheating device consisting of a closed chamber having imperforate outer walls and rotatable curved paddles disposed within said chamber substantially coincident with the longitudinal axis of said chamber and having the outer edges of said paddle terminating short of the defining walls of said chamber, a plurality of partitions disposed within said chamber and having a segment of each of said partitions perforated, said chamber being defined by a perforated substantially circular outer wall, means for blowing a hot gas through said chamber, said puffing gun being associated with means for discharging the heated grains directly from said preheating chamber into said puffing gun.

14. In an apparatus adapted for the puffing of cereal grains, the improvement which comprises a grain preheating device including a heating chamber having closed end and confining side walls, a gas inlet means, a gas exhaust means, rotatable paddles disposed within said chamber located so as to be substantially rotatable about the longitudinal axis of said chamber having outer edges terminating a short distance from the side walls of said chamber, at least one partition in said chamber dividing said chamber into a plurality of grain heating zones, said gas inlet means including a plurality of gas inlet ports having means therein for individually controlling the flow of gas therethrough, and means for passing hot gas through said inlet ports and said heating zones into said gas exhaust means.

15. The apparatus recited in claim 14 wherein said partition is perforated to permit gas passage therethrough between adjacent heating zones.

References Cited in the file of this patent

UNITED STATES PATENTS

| | | |
|---|---|---|
| 766,212 | Anderson | Aug. 2, 1904 |
| 1,558,546 | Hunter et al. | Oct. 27, 1925 |
| 1,639,909 | Suzuki | Aug. 23, 1927 |
| 2,090,523 | Whipperman | Aug. 17, 1937 |
| 2,261,456 | Warren | Nov. 4, 1941 |
| 2,698,799 | Rupp et al. | Jan. 4, 1955 |